United States Patent [19]

Singh, deceased

[11] 3,911,108

[45] Oct. 7, 1975

[54] PROCESS OF PRODUCING BOVINE MILK PRODUCTS CONTAINING SPECIFIC ANTIBODIES

[75] Inventor: Vipin K. Singh, deceased, late of Lima, Ohio, by Metropolitan Bank, executor

[73] Assignee: Diamond Shamrock Corporation, Cleveland, Ohio

[22] Filed: Feb. 14, 1973

[21] Appl. No.: 332,405

[52] U.S. Cl. .................................. 424/86; 426/335
[51] Int. Cl.² .......................................... A61K 23/00
[58] Field of Search ........................... 424/85–92; 426/334, 335

[56] References Cited
UNITED STATES PATENTS

| 2,705,696 | 4/1955 | Wolfe et al. ............... 424/89 X |
| 3,376,198 | 4/1968 | Peterson et al. ............. 424/85 |

FOREIGN PATENTS OR APPLICATIONS

| 39-1248 | 9/1964 | Japan ........................ 426/335 |
| 3,206 | 5/1906 | United Kingdom ............. 426/335 |
| 9,703 | 6/1905 | United Kingdom ............. 426/335 |

OTHER PUBLICATIONS

Hugo, W. B. "Inhibition and Destruction of The Microbial Cell," 1971, Academic Press, N.Y., N.Y., Chap. 4, Toxic Gases–Ethylene Oxide, Beta-Propiolactone, Formaldehyde, Propylene Oxide, Methyl Bromide, Ozone, Peracetic Acid, Ethyleneimine, Glycid Aldehyde, pp. 226–258.

Stepanek, J. et al., Vet. Med. (Prague), 18(5):269–280, (1973), "Effect of Furmalin and B--propiolactone on the Infectivity and Antisonicity of the Virus Causing Gastroenteritis of Pigs."

Ohmiya, K. et al., Nippon Nogel Kasaku Kaishi, 43(9):648–653, (1969), "Bactericidal Actions of Stericants in Milk."

*Primary Examiner*—Shep K. Rose
*Attorney, Agent, or Firm*—Theodore J. Dettling

[57] ABSTRACT

An enhanced yield of antibodies specific to an antigen, which neither propagates in the mammary gland of a lactating bovine nor produces in the milk of a bovine any significant quantity of antibodies specific to the antigen, is obtained in the milk of a lactating bovine by inoculating the antigen into the mammary gland of a lactating bovine on at least two consecutive days at intervals during the lactation period of the bovine; the bovine having first been inoculated with the antigen either during its dry prepartum period or during the 24 hour period after parturition. By using such a process a bovine milk product can be produced containing anti-transmissible gastroenteritis antibodies that can be used to protect baby pigs against transmissible gastroenteritis.

18 Claims, 4 Drawing Figures

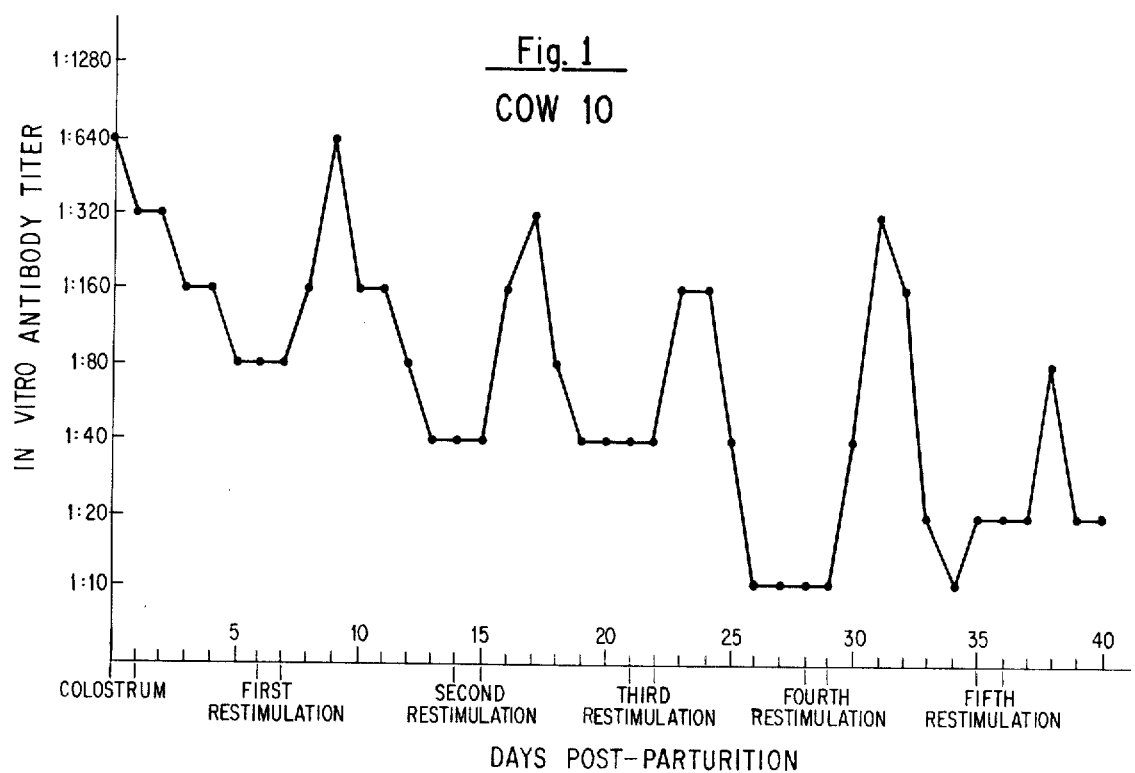
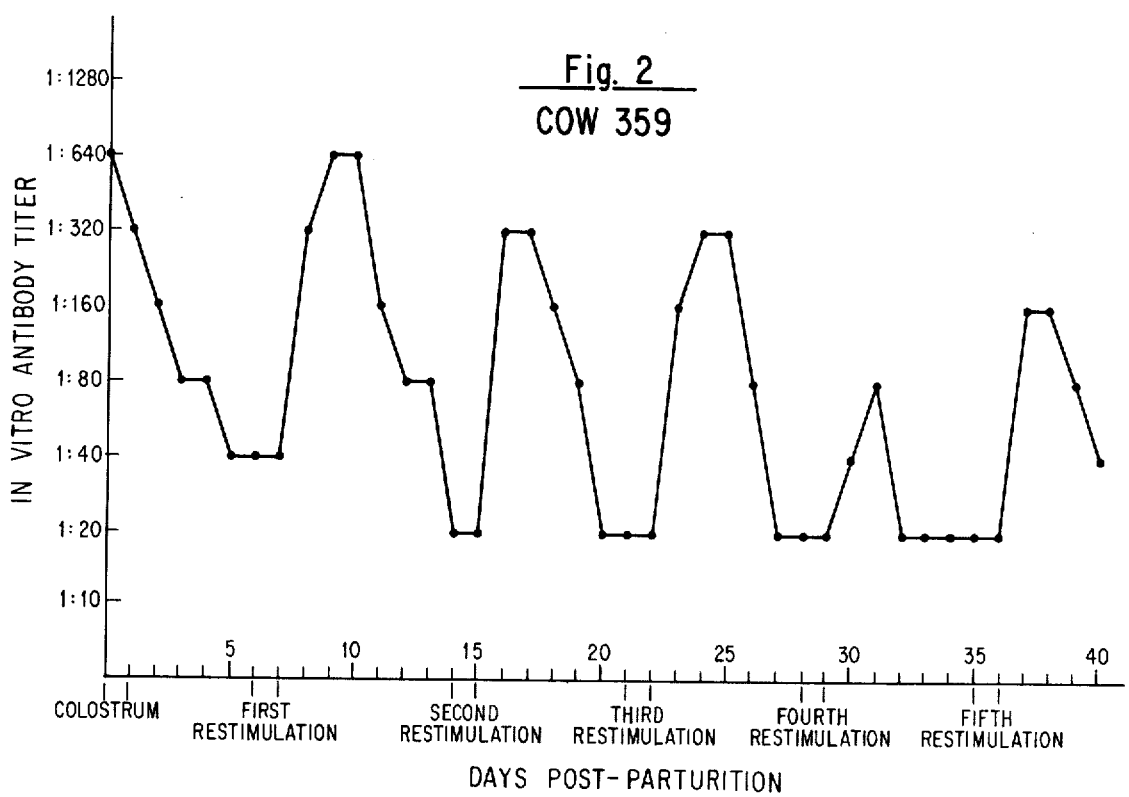

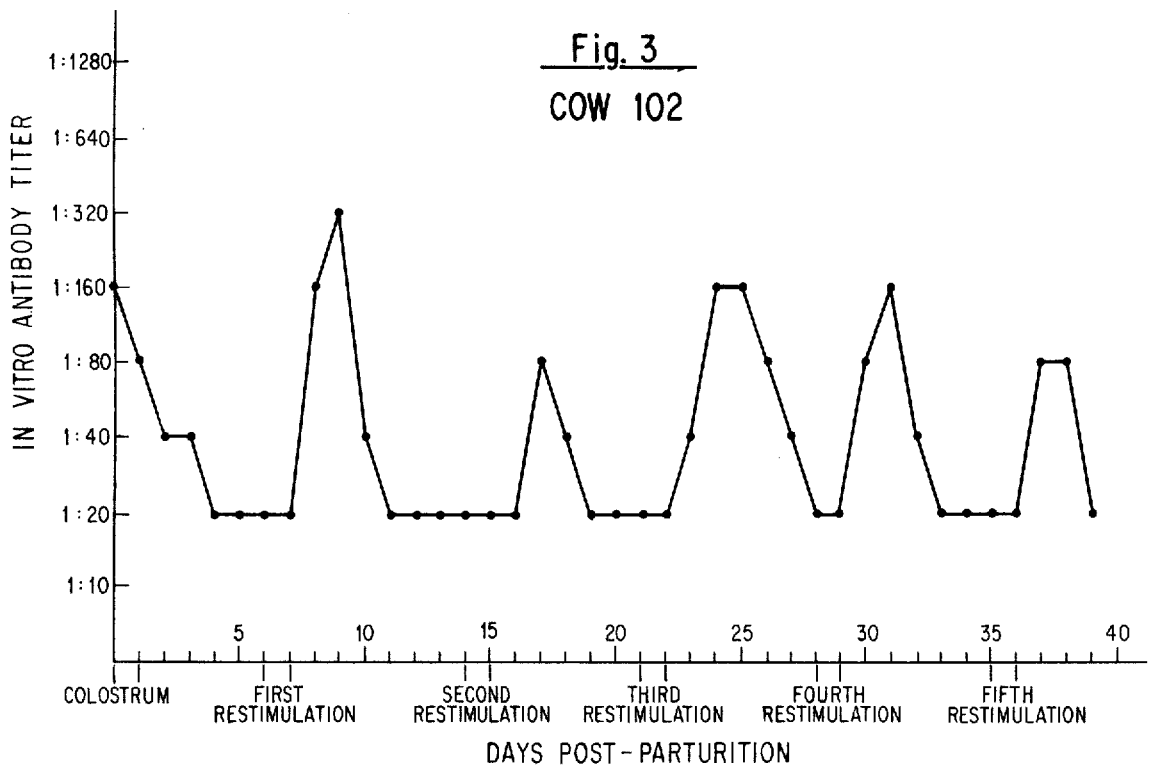
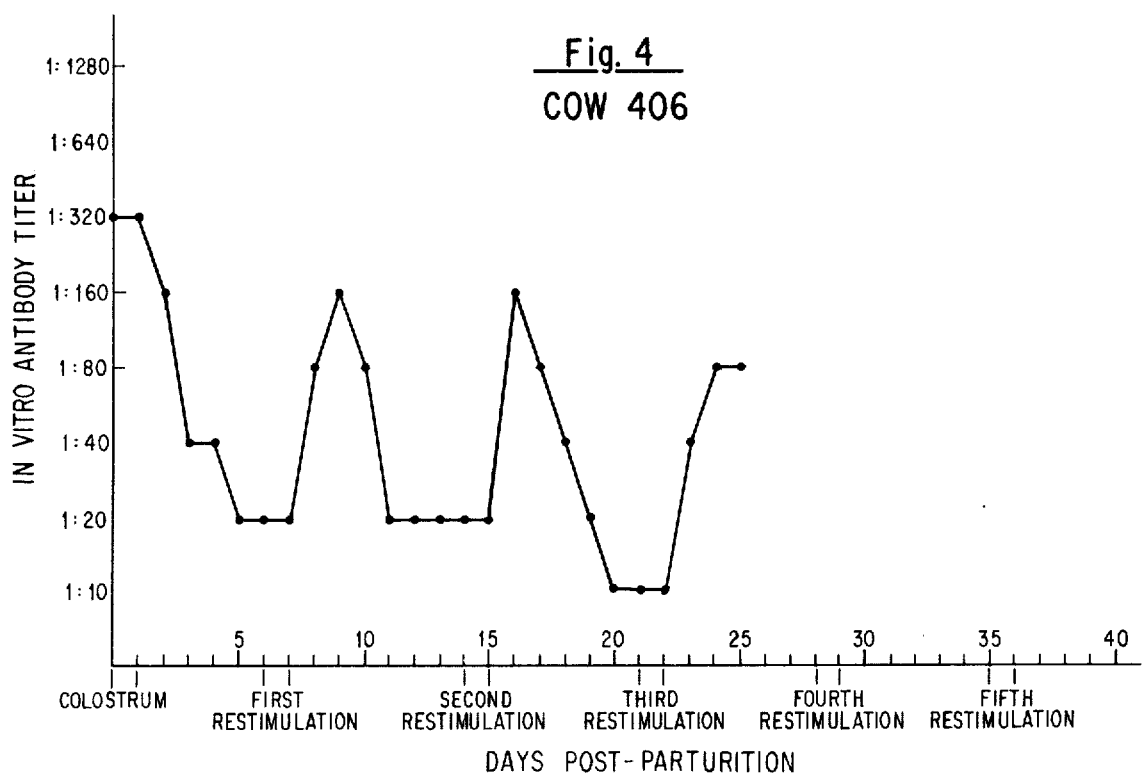

PROCESS OF PRODUCING BOVINE MILK PRODUCTS CONTAINING SPECIFIC ANTIBODIES

BACKGROUND OF THE INVENTION

In its broadest aspect this invention relates to an improved process of producing bovine milk products containing antibodies specific to antigens that do not propagate in the mammary gland of a lactating cow. In one of its specific embodiments the invention encompasses a process of producing bovine milk products containing antibodies capable of neutralizing living gut-origin transmissible gastroenteritis viruses that cause an acute enteric disease in baby pigs.

Production of Antibodies in the Milk of a Lactating Mammal

It is known that specific antibodies appear in the colostrum and milk of a variety of animals after introduction of antigens into the mammary glands. Genco, R. and Taubman, M. (1969), NATURE, 221, 679–681; Lascelles, A. K. and McDowell, G. H. (1970), IMMUNOLOGY, 19 613–620; and Norcross, N. L. (1971), J. DAIRY, SC. 54, 1800–1885.

Studies in human beings, DeMuralt, G., Gugler, E., and Boulet, D. A. A. (1960), PROCEEDINGS OF THE EIGHT COLLOQUIUM, 166–171, rabbits, Cebra, J. J. and Robbins, J. B. (1966), IMMUNOLOGY, 97, 12–24, swine, Porter P., Noakes, E. E., and Allen, W. D. (1970), IMMUNOLOGY, 18, 245–257, and sheep, Outteridge, P. M., MacKenzie, D. D. S. and Lascelles, A. K. (1968), ARCHIVES OF BIOCHEMISTRY AND BIOCHEMISTRY AND BIOPHYSICS, 126, 105–110, indicate that one of the protective antibodies in the milk of the lactating individual is a secretory IgA-type antibody differing from serum IgA antibody in possessing a complex nonglobulin component called "secretory component" or "secretory piece" and of higher molecular weight. In contrast to serum IgA which can be produced by parenteral innoculation of an antigen, the secretory IgA is produced in the milk of lactating animals following natural (oral) exposure or after local stimulation of the mammary gland with antigens. Genco et al supra, Lascelles, et al supra, and Tomase, T. B. (1967), HOSPITAL PRACTICE, 2, (7). Secretory IgA antibodies have been observed to be highly resistant to proteolytic enzymes and thus capable of passing through the stomach with maintenance of biological activity, DeMuralt, et al, supra, and to persist as a major immuglobulin throughout lactation. Because of this, secretory IgA is believed to be one of the principal sources of protection conferred by the milk. Porter et al., supra.

Mitchell et al, (1958) in the Canadian Journal of Comparative Medicine, Vol. XXII, No. 5 reported that the Myxoviruses that cause influenza, Newcastle disease, and fowl plague, besides agglutinating erythrocytes of fowl as do other Myxoviruses, also have the common property of propagating in the mammary glands of lactating cattle or goats when instilled through the teat canal into the mammary gland. They reported that the propagation continued for about a week when the virus titer declines and the virus disappears. A day or two after disappearance of the virus they observed that neutralizing antibodies appeared in the milk; first from the infected segments. Further, they observed that the antibodies continued for months, and speculated that for some perhaps for the life of the animal, and that the mammary gland could not be reinfected with the virus. They further reported that if the virus has first been inactivated, antibody formation is not induced, nor do antibodies form when viruses are instilled which do not propagate in the gland. Additionally, they reported that the unpublished work of others had indicated that the viruses of Eastern, Western and Venezuelan encephalomyelitis, vaccinia, and poliomyelitis do not propagate in the mammary gland. In addition they observed that viruses to which the gland is susceptible are not related to host range and the virus, if introduced by other routes such as subcutaneously, failed to infect or localize in the gland. Finally, they reported that no work was done to determine if the specific antibody present in the milk conferred protection in susceptible animals if given orally.

These observations of Mitchell et al. are seemingly partially contradicted by later work of Mitchell et al. (1967) reported in the Canadian Journal of Microbiology, 13, 1069–1078, wherein it is reported that Adenovirus Type 3 virus injected only once into the mammary gland of a lactating goat failed to propagate or produce antibodies but was capable of generating antibodies after a series of six successive injections at 5-day intervals — the antibodies rising to a peak 12 days following the 6th injection and then quickly receding to a constant titer of 1:50. Also, in the same article, the authors report that the Enders strain of mumps virus, Myxovirus Parotidis, while propagating in the gland, only induced the formation of a low titer of antibody.

Also seemingly contrary to the initial results reported by Mitchell et al. is the work of others who were able to produce poliomyelitis antibody by instilling the virus into the mammary gland although it did not propagate in the organ. Also, these experimenters reported that active virus gave a better antigenic stimulus than dead virus. LePine, P., Thomas, J. A., and LeClerc, J. (1962), COMPTES RENDUS HEBODOMADIARES DES SEANCES, 254, 3467–3469.

Easterday et al, (1959) in the Am. J. Vet. Res., 819–824, commenting on the work of Mitchell et al., observed that it seemed quite evident, on the basis of their work and the work of Mitchell et al., that a number of viruses cannot only propagate within the mammary gland but can also produce inflammation. Further, the authors were of the opinion that some of the idiopathic cases of mastitis uncovered by practitioners may be the result of a virus infection of the mammary gland pointing out that it was a matter of speculation whether the viruses, if any, would be specific mammary gland viruses or other types of viruses. The authors reported that, in addition to the Newcastle disease virus studied by Mitchell et al., vesicular stomatitis virus and vaccinia virus, when infused into a lactating bovine mammary gland, caused inflammatory reactions that persisted for varying periods and, in most cases, stimulated the production of considerable neutralizing antibody.

Other experimenters similarly have observed that the innoculation of the mammary gland of a lactating bovine with live viruses causes infection and in some instances a severe reaction leading to a temporary disfunction of the gland. Bannister et al. (1959) in the Can. J. Comp. Med. and Vet. Sci. 23, 47–49, reported that mastitis was produced experimentally in a cow with the virus of enzootic abortion of ewes, a member of the psittacosis-lymphograbuloma group. Greig et al. (1965) in the Can. J. Comp. Med. & Vet. Sci. 29, 57–62 found the bovine udder of non-immune animals was readily susceptible to bovine herpes virus producing an acute limited infection leading to a temporary disfunction of the gland. Straub et al. (1965) in Berl. Munich. tieraerztl. Wschr. 78(20)386–89 reported that the intramammary inoculation of 2 milliliters of freshly harvested CBV-D enterovirus suspension with a virus content of $10^{-5}$ TCID$_{50}$ produced acute catarrhal mastitis in the infected quarters which persisted for about 14 days before recovery.

Some of the earliest scientists to postulate that the etiological agent for non-specific mastitis is a virus were Peterson et al. (1938) who, in the Cornell Veterinarian 28 307–323, reported an abortive attempts to transmit nonspecific mastitis to normal lactating cows by the injection of abnormal milk or other extracts into their udders. They concluded that, while positive proof was lacking, the most probable etiological cause of nonspecific mastitis appeared to be a virus. Furthermore, based on observations extending over a period of 4 years in herds free of udder streptococci as well as observations upon two mastitis experimental cows, they postulated that the most important period in the inception of non-specific mastitis is probably the later half of the period of pregnancy when the mammary epithelial cells are young and undergoing rapid division and thus most susceptible to infection from an external source.

Petersen et al., in U.S. Pat. No. 3,376,198, disclosed that antibodies against pathogenic organisms, including live viruses and bacteria, can be produced in normal milk, that is milk obtained from cows free from any signs of mastitis or infection, by inoculating into the mammary gland cistern of a pregnant cow, either through the teat canals or hypodermically through a mammary wall, an antigen originating from the pathogenic organism if it is rendered nonpathogenic. Peterson et al. disclosed that living viruses and bacteria were rendered nonpathogenic, and thus suitable for their process, by killing or inactivating the virus or bacteria. Petersen et al. also disclosed that, after parturition, declining antibody concentrations can be increased by periodically introducing booster shots of the selected antigen into the udder during the lactating period or alternatively by injecting the booster shots intravenously, intramuscularly or subcutaneously. They disclosed that such booster shots may be spaced to suit the convenience of the operator but should not be administered so frequently that an antiphylactic reaction occurs. For most species of ungulates the patentees pointed out this time is less than about 10–14 days but, in any event, should not be more frequent than every other day if local irritation and congestion was to be avoided.

Mitchell et al. (1969) in Canadian Journal of Comparative Medicine, 33, 166–168, also disclose a pre- and post-parturition inoculation of the mammary gland of an ungulate. In particular, these authors reported that a pregnant, non-lactating goat when instilled with Herpes simplex, which while not being subsequently detectable in the mammary gland, did, after parturition, generate a small detectable amount of milk antibody which could be increased slightly to a 1:50 titer by several injections of the virus at irregular intervals 1 month after parturition.

Transmissible Gastroenteritis

Transmissible gastroenteritis (TGE) is a highly infectious swine viral disease which causes serious economic losses throughout most of the world. TGE may affect swine of all breeds and all ages but causes extensive mortality only in very young pigs. TGE was first described by Doyle and Hutchings in 1946 (J.A.V.M.A., Volume 108; 257–259) and has since that time been reported not only in many states of this country but also in many foreign countries. It seems to be generally accepted that TGE is caused by a virus belonging to the Coronavirus group and that there is only one serotype of the virus. Bohl, E. H., Gupta, R. K. P. McCloskey, L. W., and Saif, L. (1972), JOURNAL OF THE AMERICANN VETERINARY MEDICAL ASSOCIATION, 160, (4), 543–550.

The clinical signs of TGE vary with the age of the infected pig. In very young pigs the mortality may reach 100 percent while pigs infected after weaning seldom die. The primary clinical sign is vomitation and diarrhea followed by dehydration. Death is apparently caused by severe electrolyte disturbances and acidosis. Hooper, B. E. (1972), PFIZER TWENTIETH ANNUAL RESEARCH CONFERENCE, 110, 102–121.

Baby pigs exhibiting resistance to an epidemic of TGE are believed to be protected by the colostrum and milk of the sow upon which they are sucking. This protection is considered to be afforded by a passive lactogenic immunity provided by antibodies contained in the colostrum and milk of an immune sow which has, prior to farrowing, been exposed to the TGE virus. Because TGE virus operates on the surface of intestinal mucosa and not in the systemic circulation, a continuous supply of the sow's milk is needed for protection of the baby pigs. Haelterman, E. O. (1965), JOURNAL OF THE AMERICAN VETERINARY MEDICAL ASSOCIATION, 147, 1661.

Pregnant sows fed gut-derived TGE virus developed such immunity to the virus and protect their suckling pigs. Ristic, M. (1968), ILLINOIS RESEARCH 10, (2), 12–13. While this practice has generally been successful in passively immunizing the nursing litter, it is potentially hazardous and hence unacceptable to U.S.-D.A. owing to the possibility of perpetuating the disease or introducing it into uninfected farms.

As a consequence, efforts have been made to utilize the live gut-origin TGE virus by injecting it into the mammary gland of pregnant sows. While mild swelling of the injected mammary gland occurred, farrowing was normal, and the sows remained clinically normal during and after experimental challenge of the nursing litter. Further, none of the nursing piglets developed any clinical signs following challenge. Djurickovic, S. and Thorsen, J. (1970), THE VETERINARY RECORD, 87, 62–64. This seemingly contradicted earlier work which had demonstrated that subcutaneously and intramuscular immunization of sows failed to protect their suckling piglets. Bay, W. W., Doyle, L. P., and Hutchings, L. M. (1953), JOURNAL OF THE AMERICAN VETERINARY MEDICAL ASSOCIATION, 102, 200–202.

Similar results have been reported when live cell-cultured TGE virus is used in place of the live gut TGE virus. Thorsen et al. observed that TGE virus cultivated in pig kidney cell cultures for forty passages, when inoculated into pregnant sows intramammarily, protected the resulting nursing litter from artificial challenge while litters nursing sows which had been immunized intramuscularly either became sick or died. Thorsen, J. and Djurickovic, S. (1970), CANADIAN JOURNAL OF COMPARATIVE MEDICINE, 34 177–180.

Thorsen et al also tested the intrammammary innoculation of pregnant sows with inactivated TGE virus of cell culture and tissue origin. It was observed that two intramammary innoculations of either vaccine, while stimulating some degree of immunity as measured by the antibody titers in the serum and milk, did not afford absolute protection in that the nursing pigs exhibited morbidity. However, three intramammary innoculations of the pregnant sow with either of the inactivated TGE viruses, besides causing higher levels of antibody in the serum and milk, conferred complete protection of the nursing pigs as judged by the absence of any clinical signs following experimental challenge. Thorsen, J. and Djurickovic, S. (1971), CANADIAN JOURNAL OF COMPARATIVE MEDICINE, 35, 99–102.

In U.S. Pat. Nos. 3,479,430 and 3,585,108, Welter teaches that a TGE virus attenuated by rapid serial passages in growthsupporting tissue cultures, such as pig kidney cultures, when intramuscularly innoculated into sows during the last 6 weeks of pregnancy confer immunity to the nursing pigs. In U.S. Pat. No. 3,704,203 Welter claimed that a low-passage (5 to 15 passages) cell-cultured TGE virus, when inactivated and similarly intramuscularly innoculated into a pregnant sow during the last weeks of gestation conferred a high degree of immunity to the nursing litter when orally challenged at 4 days of age with 1,000 infectuious doses of TGE virus.

In U.S. Pat. No. 3,519,710 Bass claims that direct active immunization against TGE can be provided to susceptible swine piglets irrespective of the immunity of the nursing dam by administering either orally or parenterally to the piglets an attenuated porcine cell-cultured TGE virus vaccine quantitively sufficient to invoke the production of antibodies to provide immunity against TGE.

Recently, work reported by Ristic et al. (Feb. 15, 1972) in J.A.V.M.A., Vol. 160, No. 4, contradicts, however, some of the results of this earlier work. Ristic observed that high-passage cell-culture TGE virus given orally, intramammarily, or intramuscularly, while stimulating the development of antibodies in the colostrum and serum of exposed sows capable of neutralizing the cytopathic effect of cell-cultured TGE virus, conferred no protection to challenged pigs nursing the vaccinated sows, and further that the colostrum of the sows when tested by an in vivo neutralization test was equally negative. The preponderance of antibodies identified in the colostrum of the vaccinated sows was found to be of the IgG class of immunoglobulins rather than the IgA class of immunoglobulins isolated from the colostrum of sows that had been prefarrowing orally innoculated with the live gut-origin TGE virus. Ristic suggested two possible hypotheses to explain the immunogenic discrepancies between the gut-origin and cell culture propagated virus; (a) the cell culture virus may be a mutant of the gut-origin virus, or (b) the two viruses while being serologically similar are immunogenically different TGE viruses.

In explaining the protective effect of the IgA antibody predominantly present in the colostrum and milk of a lactating sow which has been prefarrowingly innoculated with live gut TGE virus, Ristic suggests that it is probably due to the ability of this antibody to resist proteolytic enzymes and thus pass through the stomach functionally intact, apparently due to its possessing the secretory piece complex non-globulin component.

Other investigators had earlier reported that cytopathic cell-cultured TGE viruses may not be the only etiologic agent of TGE and that another non-cytopathic virus, which grows in the cell-cultures and can produce signs of TGE with ensuing death or resistance to further infection, may also be involved in the overall etiology of TGE. McClurkin, A. W. and Norman, J. O. (1966) CANADIAN JOURNAL OF COMPARATIVE MEDICINE AND VETERINARY SCIENCE, 30, 190–198; and Konishi, S. and Bonkoski, R. A. (1967) AMERICAN JOURNAL OF VETERINARY RESEARCH, 28, (125), 937–942.

In spite of a plethora of work by university and industrial scientists devoted to the etiology and the prevention or cure of TGE, it is today acknowledged that there is still not available an entirely satisfactory means to either actively or passively immunize susceptible baby pigs. Bohl et al., supra. The one TGE vaccine licensed by the Veterinary Biologics Division of the U.S. Department of Agriculture, a modified live virus vaccine attenuated to the degree that it will not cause sickness or death when administered orally to 72-hour-old orphan baby pigs, while considered safe, is only partially satisfactory. On the other hand, passive immunization of the baby pigs by the milk of sows orally innoculation with the live gut TGE virus can not be used because of the danger of spreading the disease.

Even if a satisfactory TGE vaccine were to be developed for the passive immunization of nursing pigs, it would still be subject to certain inherent disadvantages. First, and most importantly, would be the high cost of such a vaccination program because of the necessity of vaccinating all pregnant sows irrespective of whether a TGE epidemic is present because the sows can only confer lactogenic immunity to their litters if vaccinated prior to farrowing. It is in effect an insurance type program, the cost of which many pork producers are unwilling to accept. Secondly, lactogenic immunity can be broken by a severe challenge of the TGE virus or if the baby pigs ingest an inadequate amount of the sow's milk due, for example, to an abnormal lactation pattern by the sow. Finally, lactogenic immunity may fail if the titer of TGE antibodies in the milk of the sow decreases appreciably during the lactation period. Bohl et al., supra.

Attempts to confer active immunity to the baby pigs (i.e. those under 2 weeks of age when mortality is greatest) by the use of an attenuated TGE vaccine, as claimed in U.S. Pat. No. 3,704,203, have not succeeded generally being found to be ineffective due, it is thought, to the immunogenic immaturity of the baby pigs.

Finally, no prophylactic or therapeutic product is known to prevent or cure epidemic outbreaks of TGE based on chemotherapy or anti-TGE antibody therapy even though the etiology and pathogenesis of TGE have long been elucidated and there exists an urgent need for such remedial prophylectic or therapeutic measures.

SUMMARY OF THE INVENTION

Considering this present state of the art with respect to the stimulation of antibodies in the mammary gland of a lactating bovine, it is a general object of this invention to provide a method of increasing in the milk of a lactating bovine the quantity of antibodies specific to an antigen that does not propagate in the mammary gland of a lactating bovine but is capable of stimulating a measureable antibody response.

Further, specific objects of this invention are the provision of a bovine milk product containing anti-TGE antibodies capable of protecting TGE-susceptible baby pigs, the provision of technically and economically feasible methods of producing such a bovine milk product, and, finally, the provision of a method of protecting baby pigs against TGE employing such a bovine milk product.

These and still other objects and advantages of the invention, which will be apparent to those skilled in the art from the following description, are provided by restimulating the mammary gland of a lactating bovine with an antigen, which does not propagate in the gland but is capable of stimulating a measurable antibody response, on at least two consecutive days at intervals during the lactation period of the bovine, the mammary gland of the bovine having first been prestimulated with the antigen by inoculating the antigen into the gland of the bovine either during its dry prepartum period of during the 24 hour period after parturition.

BRIEF DESCRIPTION OF THE DRAWINGS

FIGS. 1, 2, 3 and 4 are graphs illustrating the in vitro assayed TGE antibody titers of the milk obtained from cows 10, 359, 102 and 406 respectively which were restimulated at regular intervals with an immunogenic living TGE virus according to the invention process as described in the example.

DESCRIPTION OF THE PREFERRED EMBODIMENTS

While any bovine may be used for the practice of this invention, dairy cows will normally be used and particularly those breeds giving the highest yield of milk such as the Holstein breed.

The antigens which may be employed in the practice of this invention may be any substance which, after intramammary injection into the mammary gland of a lactating bovine, (1) does not propagate in the mammary gland, (2) does not cause any significant mastitis reaction in the mammary gland and (3) is capable of stimulating a measurable antibody response in the mammary gland after one to six single intramammary gland injections at intervals of 4 to 10 days. Potentially useful antigens may be any viruses, mycoplasma, rickettesiae, bacteria, fungi, protozoa, proteins, allergy causing substances, and so forth that exhibit these three characteristics when intramammarily inoculated into the mammary gland of a lactating bovine. Illustrative of antigens that may have these three characteristics and that thus may be employed in the invention process are: transmissible gastroenteritis virus, calf scours virus, swine dysentery bacteria, Syncythial virus, Mycoplasma, Vibra cholera bacteria, poliomyelitis virus, Escherichia coli bacteria, Shigella sp bacteria and certain causative agents of respiratory diseases in which protection is associated with locally produced secretory IgA. Any living antigens, such as bacteria, virus and fungi that cannot be used as such because they produce a significant mastitis reaction may be rendered suitable for the invention process by first treating them by methods well known in the art, such as attenuation, inactivation, or detoxification, to neutralize or diminish to an acceptable level their infective and pathogenic properties for the mammary gland care being taken not to significantly alter the original immunogenic characteristics of the living organism. Because living organisms normally generate maximum antibody response, they are preferred for the invention if no significant mastitis reaction is engendered by their use. The antigens are suspended in a suitable liquid medium, such as a sterile physicological saline solution, for the intramammary injections, care being taken to insure that they contain no contaminating substances, that could cause infection of the mammary gland or other extraneous antigens that can diminish the stimulation of antibodies from the antigen.

In determining whether any potential antigen will operate in the process of this invention a quantity of the antigen, dispersed in an aseptic biological solution compatible with the mammary gland of the cow, is injected into each quarter of the mammary gland of a lactating cow in a concentration and volume likely to engender an antibody response but not so great as to cause a mastitis reaction. If the antigen appears to propagate in the gland, as evidenced by the presence of the antigen in the milk of the bovine obtained in the second or later milkings after inoculation, and a sizeable quantity of antibodies are subsequently detected in the milk after the antigen is no longer present, then it would not be a suitable antigen for the practice of this invention. If, however, no virus propagation or antibody response is noted within fourteen days after the first injection then injections of either constant or alternatively of increasing dosages of the trial antigen are repeated at regular intervals such as 4 to 10 days for up to six inoculations to determine if any antibodies are produced in the inoculated mammary gland as evidenced by the presence of antibodies in the bovine milk. If during the course of giving these trial inoculation shots, a mastitis reaction not attributable to any other cause is observed and the volume and dosage of the shots is not considered to be excessive, or, if after six trial stimulations of either constant or gradually increasing dosages, no antibodies are found in the lactating bovine's milk then it can be assumed that the trial substance will not be a suitable antigen for the practice of this invention. However, if the candidate antigen does produce a measurable antibody response in the lactating bovine's udder, as determined by the presence of antibodies in the milk of the bovine, without showing any signs of propagation and further without causing any significant mastitis reaction, then it could be considered a suitable antigen for the practice of the invention process. While usually only one kind of latent antigen is preferably employed per lactation period, there may be instances when a mixture of antigens may be used to give an immune milk product having more than one type of antibody if trials indicate that this can be done without engendering a mastitis reaction and an acceptable level of antibodies can be obtained. In any event, the same type or types of antigens should be used throughout any one lactation period. Poorer results are obtained if new types of latent antigen are first used after lactation has commenced. Further, if the immune milk product is to be used to assist in protecting animals from disease caused by the organism from which the antigen is derived, then the antigen used should be one that stimulates the production of antibodies which neutralize the organisms as they occur in their natural hosts.

A variety of methods can be used to detect and quantitate the bovine milk antibodies. These methods include in vitro serologic tests in which the reactions between the antigen and milk antibody are observed and recorded microscopically or macroscopically as well as by in vivo neutralization tests. In the latter test, the host animal is the indicator of the test results.

For the multiple consecutive day restimulation procedure of this invention to effectivety produce increased yields of antibodies to the latent antigen, it is necessary that the mammary gland of the cow be prestimulated either during its preparturition dry period or as soon after calving as is feasible and no later than 24 hours thereafter, with at least one and preferably two inoculations of the latent antigen. As the preparturition prestimulation procedure has been found to generate the greatest antibody response in the lactating bovine, it is the preferred method. While one preparturition inoculation into the dry mammary gland will induce increased antibody yield in the subsequent milk of the cow, it is preferred to use at least two and in some instances three or more preparturition inoculations to maximize antibody yield. When more than one preparturition inoculation is employed better results are observed when they are spaced about one to two weeks apart with the last inoculation being given about one week to three weeks prior to the expected calving date. Also when only one prepartum inoculation is used it also is best administered about 1 to 3 weeks before calving. If the last or only prestimulation is administered within the 6-day period immediately prior to calving, the yield of antibodies in the colostrum and first milk can be reduced for some antigens. Further, if multiple prepartum prestimulations of some antigens are given too close in time, such as 1 to 6 days apart, there can be increased risk of causing damage to the udder.

When a lesser quantity of antibodies is acceptable, or if for some reason the cow has not been prestimulated prior to calving, then the cow can be prestimulated as soon after calving as is possible with the time of injection being no later than 24 hours after calving. When this "day-of-calving" inoculation procedure is employed, higher antibody response is obtained after subsequent multiple consecutive-day restimulations by giving a second inoculation within 18 to 30 hours after the first inoculation. Prior to such second prestimulation the cow should be first milked.

The volume and dosages of either the preparturition or the day-of-calving prestimulations should be of the same general order as that used in the multiple consecutive-day restimulation procedure hereinafter described.

The multiple consecutive-day restimulation procedure will normally be initiated when the level of antibodies in the milk following the colostrum drops to an economically unacceptable level. This initial interval can vary with different cows receiving the same antigen or with cows receiving different antigens, and hence no exact time period can be specified. Generally though for most antigens an interval of about 5 to 10 days will be the usual period.

The multiple restimulations of the mammary gland of the lactating bovine are preferably administered so that there is a time period of 18–26 hours between the inoculations on consecutive days. When less than about 18 hours is utilized subsequent antibody production may be diminished, while when a period of greater than about 26 hours is employed there is a chance of the cow's udder becoming engorged with milk and inflamed, thus making it susceptible to bacterial infection and damage with possible consequent loss of future milk production. As used in the claims the expression "consecutive days" means any series of two or more restimulations administered so that there is about an 18 to 26 hour interval between any two restimulations even though there may be instances where they would be adminstered on the same day when administered less than 24 hours apart or with an intervening day when administered more than 24 hours apart.

To maximize the effectiveness of the multiple consecutive-day restimulation procedure, cows are preferably milked out only once and as close in time prior to the administration of the restimulation shots as is feasible. If milked out more than once or any appreciable time before restimulation, such as 4 hours or more, subsequent yields of antobidies may be significantly reduced. For this reason, the period between milking out and restimulation should be kept to a practical minimum and the cows milked only once in the time periods between consecutive shots. After the final consecutive day restimulation, the first milking of the cow is preferably done about 18–24 hours after inoculation if maximum antibody production is to be realized. However, for any cow that is a high milk producer, it may be necessary, after each of the restimulation inoculations, to partially milk it before the expiration of the preferred 18 to 26 hour periods between complete milkings, if the udder becoes too full of milk and distended and the cow can not tolerate an 18 to 26 hour wait between milkings without possible damage to the udder.

While two consecutive-day restimulations will normally be ascertained to be optimum for most antigens, there may be some antigens that will yield a maximum antibody if a three consecutive-day restimulations are employed. If a three-inoculation schedule is found to be most advantageous and is followed, then, of course, the preferred practices above described with respect to the number and timing of milking would be equally applicable and should be followed if maximum antibody yield is to be obtained.

In practicing the multiple consecutive-day restimulation procedure of this invention, it will be noted that the antibody response will rapidly rise during the following 1 to 2 days after the last consecutive-day restimulation to a maximum yield, which, in some instances have been observed to be as much as sixteen times the antibody level before restimulation, and then gradually recede to about the previous titer. While the number of days of increased antibody production may vary between different series of restimulations and also between different antigens it will normally be observed that enhanced yields can be obtained for about 4 to 10 days, after which the multiple consecutive-day restimulation procedure may again be utilized to restimulate the production of the milk antibodies. For most antigens, the optimum time for repeating the multiple restimulations will generally be the first or second day following the drop to the previous restimulation titer level. However, there may be situations where the continuing antibody response may be sufficient to warrant continuation of milking for a number of days if an economic analysis indicates that the value of antibodies being produced would not justify an immediate restimulation. In any event, it is anticipated that for most latent antigens the optimum economical interval between consecutive day inoculations will be determined to be in the range of 4–10 days with 5–8 days being the most usual and preferred interval, care being exercised that the series of consecutive restimulations are not so close in time as to cause immunological paralysis of the udder or engender a mastitis reaction.

In both the preparturition or day-of-calving prestimulations and the multiple consecutive-day restimulations it is preferred that each quarter of the mammary gland be inoculated, preferably using a hypodermic syringe and needle inserted into the wall of the udder close to the base of the teat in such a manner that the injected antigen will reach the cistern of the udder. While infusion through the teats of each quarter may also be used, this method can introduce infectious organisms into the gland and hence is not as preferred. With either method, of course, aseptic administration procedures should be used. When less than all quarters are inoculated, the quantity of antibodies obtained in the milk may be diminished. The volume of the antigen dose inoculated into each quarter should, for most antigens, be from about 1 to 10 milliliters. Dosages of less than about 1 milliliter may not give good distribution of the antigen in the udder while more than about 10 milliliters may cause mastitis and possible damage to the udder. With some antigens even 10 milliliters may be excessive and in those cases the maximum dose should not exceed about 5 to 7.5 mls. The concentration of the antigen thus will normally be adjusted so that this preferred 1 to 10 milliliter injection dose per quarter can be used. In this connection, when the concentration of the antigen in the suspending liquid medium is too low, thus requiring doses of more than about 10 mls. per quarter for each inoculation, then it may be concentrated by means such as lyophilization or perevaporation. Ideally, if possible, the concentration of the antigen in the doses should be at or slightly below the optimal level as it occurs in the host in which it is produced.

The optimum dosage (volume X titer of the antigen) of the prestimulation and restimulation inoculations required to maximize antibody production will vary with the type of antigen being used, but can be readily determined by preliminary experimentation for any given antigen. In this connection, the dosage of the antigen used to determine that it was suitable for the practice of the invention might be utilizing as a starting point for such preliminary experiments. Generally, the dosage will be determined by ecomonic considerations; that is, the minimum dosage commensurate with a high yield of antibodies will be utilized. Above a certain dosage, further increases in yield will be so minimal as not to justify the cost of the additional antigen used. Finally, the dosage of the latent antigen should not be so great that it can cause immunogenic paralysis, mastitis, or any other mammary gland disfunction.

The process of producing antibodies by the multiple consecutive-day restimulations of this invention will normally be continued for as long as the cow is producing an acceptable yield of milk and the milk is found to contain a useful level of antibodies. Since dairy cows usually continue to produce commercially acceptable yields of milk for 5 months and in some instances up to 7 months after calving, the multiple restimulation process may be continued for 5 and possibly up to 7 months if an economically useful level of antibodies continues to be obtained in the milk. If, however, the level of antibodies obtained diminishes during the latter months of the lactation period, thus increasing its cost to an unacceptable level, or a mastitis reaction occurs then, of course, it may be decided to discontinue the invention restimulations. In any event, no matter what the milk production history of any cow, if she is to be used after her next calving for producing antibodies for either the same or a different antigen, she should be dried up about 8 to 10 weeks before the expected calving date, to ensure good milk producing capability in her following lactation period in accordance with good dairy farming practice.

Cows, being restimulated according to this invention, are preferably milked using aseptic procedures to minimize contamination of the milk with infectious organisms.

The whole, immune milk produced by the process of this invention may be used directly as produced, as for example as a therapeutic or prophylactic feed supplement. Alternatively, the immune milk may be further purified or concentrated as for example by decreaming the whole milk to obtain a skim milk product for such purposes as enhancing storage stability or increasing the concentration of antibodies in the product.

When an immune milk product free of casein is desired, then the skim milk product can be treated with a suitable casein-precipitating substance, such as acetic acid, lactic acid, phosphoric acid, rennet and so forth, and then removing the precipitated casein to give a whey product containing the majority of the antibodies present in the original whole milk. An even purer product may be obtained, if desired for example for analytical purposes, by salting out the gamma globulin fraction of the whey containing the preponderance of the antibodies with a gamma globulin-precipitating salt such as ammonium sulfate, sodium sulfate, and so forth. The precipitated gamma globulin fraction could, after washing and drying, be used as a solid, or alternatively could be redispersed in a suitable dispersing medium. Finally, if desired, the different antibodies present in the gamma globulin fraction may be isolated by redissolving the gamma globulin precipitate in a suitable solvent medium and subjecting the resulting solution to a column chromatography or electrophoresis treatment.

Any of the above enumerated fluid immune milk products could, if desired, be further concentrated, if desired, as by vacuum evaporation under temperature and time conditions that minimize loss of antibody potency. Alternatively, any of the above immune fluid milk products could be converted to a solid product essentially devoid of the dispersing medium by such methods as spray drying or vacuum drying wherein the temperature used are chosen to minimize antibody loss, or by freeze drying. Such solid products may be used as such or may be redispersed in a suitable dispersing medium by the ultimate user.

Irrespective of the form it takes, each of the above described products is considered to be a milk product containing antibodies as that expression is used in the following claims. Such products will normally be stored prior to use at temperatures that minimize antibody potency loss. For the same purpose or to preserve sterility, stabilizers or preservatives such as Kaopectate compound, merthiolate or antibiotics may be admixed with any of the immune milk products.

The immune milk products may be used to assist in preventing or curing diseases caused by the organism from which the antigen has been derived. It is envisioned that they will be especially effective in helping to control enteric diseases where the causative agents propagate in the digestive tract. In such diseases, the immune milk products can be fed to threatened or sick animals to help in the prevention or cure of the disease in a feed or liquid supplement in a manner analogous to that now used for antibiotics. In respiratory diseases, the more purified products, such as the gamma globulin fraction, may be administered in a suitable biological solution in atomized form to threatened or infected areas. For systemic diseases such purified immune milk fractions may best be administered parenterally in suitable biological dispersing mediums.

The more purified immune milk products, such as the whey or gamma globulins fractions may also be used as analytical reagents to identify, characterize or quantitate unknown kinds or amounts of a particular microorganism for which they are specific. Finally, they may be used to isolate one organism from a mixture of organisms by methods like that used for the immunological isolation of male spermatoza shown in U.S. Pat. No. 3,692,897.

EXAMPLE

Preparation of the TGE Antigen Used for Inoculation of the Bovine

The TGE antigen utilized for the prestimulation and restimulation of the bovine, was an Ohio TGE virus isolant propagated in and harvested from 3-day old baby pigs according to the following procedure.

The Ohio TGE isolant was isolated from the intestinal and mucosal tissues of baby pigs during an outbreak of TGE in the area of Spencerville, Ohio during 1968-1969. The isolated virus was identified as the pathogen of TGE because it produced typical signs of TGE such as vomiting, watery diarrhea and dehydration when fed to 3-day old pigs, and further because it gave smears like those of previously identified TGE viruses when stained with fluorescein-conjugated anti-TGE antibodies.

The Ohio TGE virus isolant obtained from this outbreak was then used as follows to prepare a TGE stock virus. Three day old baby pigs were orally inoculated with an infective dose of the Ohio TGE virus isolant and after becoming acutely ill, were killed and the intestinal contents and muscosal tissue of the infected baby pigs were extracted and purified according to the method described by Ristic et al. in "Electron Microscopy and Ether Susceptivity of Transmissal of Gastroenteritis Viruses of Swine", Am. J. Vet. Res. 26 (1965) 609–616. More particularly the baby pigs infected with the Ohio TGE virus isolant and showing typical signs of TGE were killed 48 hours after infection. The ilium, jejunum, and duodendum were removed, put in glass containers, and stored at minus 65°C. for not less than 24 hours. The tissues were then thawed at 4°C, suspended in a 0.15 M phosphate buffered saline (PBS) solution containing 1,000 units of penicillin, 2.5 mg. of streptomycin and 5 units of mycostatin per milliliter of the PBS solution in a volume sufficient to give a 20% (W/V) dispersion, homogenized in an electric blender at 4°C. for approximately two minutes and then centifuged at 10,000 × G for 20 minutes at 4°C. The resultant supernatant fluid was then further purified to remove any contaminating viruses or bacteria by layering it on top of undiffused sucrose density gradient layers (10, 20, 30 and 40 percent by weight sucrose) contained in 50 milliliter plastic centrifuge tubes, and then centrifuging the tubes at 41,000 × G for 30 minutes at 4°C. The band of material forming between the 10 and 20 percent sucrose layers was recovered and determined to be a highly infectuous TGE virus having an $LD_{50}$ titer of $10^{-5}$ per milliliter (ml) as determined by the baby pig titration test described hereinafter.

The TGE virus antigen was prepared by feeding the TGE stock virus to 3-day old specific pathogen free (SPF) pigs housed in individual isolation units, each pig being given a dose of $10^5$ $LD_{50}$ units of the TGE virus orally 2 hours after a previous feeding. The pigs were fed 100 milliliters of a milk formula consisting of pasteurized store milk, eggs and mineral mix 3 times a day. Infected pigs showing typical signs of TGE were killed 48 hours after infection and the ilium, jejunum and duodenum were removed and stored in glass jars for −65°C. for not less than 24 hours. The infected tissues were subsequently thawed at 4°C., and emulsified in a precooled electric blender for 1–2 minutes. Cold Hanks' Balance Salt Solution (HBSS) at a pH of 7.2 was then added gradually to the blender in a volume sufficient to make a 10% (W/V) gut-suspension (10 grams of the emulsified gut tissues in 90 mls. of HBSS) which was then centrifuged in 250 milliliter plastic centrifuge tubes at 10,000 × G for 20 minutes at 4°C. The resulting supernatant liquid, contained the TGE virus antigen was collected, cooled, and 0.05 milliliters of calf serum, 100 units of penicillin and 100 mcg steptomycin per milliliter of the virus suspension were added and the final TGE virus antigen stored in vacine bottles at −65°C. until used.

The virulence of the TGE virus antigen was determined by titrating the virus in 3-day old pigs, the results obtained being expressed as Lethal Dose $_{50}$ ($LD_{50}$) — the highest dilution of the TGE virus that kills 50% of the 3-day old pigs orally inoculated with the TGE virus antigen. The $LD_{50}$ titration procedure was conducted by diluting the 10% TGE virus antigen dispersion with the Hanks' Balanced Salt Solution having a pH of 7.2 using 10-fold dilutions starting with 1:10 up to 1:1,000,000 dilutions. One milliliter of each virus dilution was given orally to each of six 3-day-old baby pigs 2 hours after a previous feeding after which they were kept in individual isolation units and fed the milk formula previously described 3 times a day. The pigs were observed daily for signs of TGE and the mortality rates recorded 7 days after the TGE virus inoculation. Based on the mortality rates observed, the 50% end point ($LD_{50}$) was calculated by the method of Reed and Muench described in AM. J. Hyg. 27; 1938 (493–497).

A series of batches of the TGE virus antigen prepared and tested as above described were found to have infectivity titers ranging from an $LD_{50}$ of $10^{-5}$ to $10^{-5.5}$ per milliliter. Further, if five milliliter doses of the TGE virus antigen batches (5 × $10^5$ $LD_{50}$) are fed to pregnant sows, seriologically negative to TGE virus, 4 weeks before their expected farrowing dates, their nursing young wer protected when challenged with 100 $LD_{50}$ units of the NADL TGE virus on or after 3 days of age. The TGE virus antigen was stored at $-65°$ until needed. When tested by standard test procedures, no bacteria, fungi or mycoplasma were identifiable in the TGE virus antigen.

Innoculation of Bovine with the TGE Virus Antigen

Six pregnant Holstein cows, 5–9 years old and no longer lactating, were intramammarily injected into each quarter with 5 mls. ($10^5$ $LD_{50}$ per ml.) of the TGE virus antigens described in Table I at a site approximately 1½ inches above the base of the test using polypropylene disposable syringes and 22 gauge steel needles according to the inoculation schedule shown in Table 1. After calving, these cows plus one additional cow receiving no prepartum inoculations, were inoculated within 1 hour of being milked on two consecutive days (22 to 24 hour intervals were used) on the post partum days shown in Table 1 to restimulate the production of anti TGE antibodies.

The colostrum was collected within 12 hours after calving and thereafter the cows were milked twice a day for the 6 day or 7 day intervals between restimulation shots, except for the periods following the restimulation inoculations when the cows were milked only once about 22 to 24 hours after each inoculation.

Assay of the Anti-TGE Antibody in the Colostrum and Milk of Inoculated Bovine

The in vitro and in vivo assay of the anti-TGE antibodies contained in the filtered and decreamed postpartum colostrum and milk, was determined as described in footnotes 4 and 5 for the days after calving shown in Table 1. The anti-TGE antibody assay data showed that the two prepartum innoculations of the Ohio isolant TGE virus antigen of cows 102 and 406 were apparently sufficient to stimulate as large a concentration of the baby pig protective anti-TGE antibodies in the post-partum colostrum and the first few days milk as did three prepartum inoculations of cows 10 and 359. After restimulation, however, it seemed that a slightly greater antibody response was obtained in cows 10 and 359 receiving three prepartum inoculations.

The use of intramuscular inoculations to supplement the intramammary inoculations in cow 406 was not observed to increase the TGE antibody response either in the colostrum or first milk or in the milk obtained after restimulations as compared to cow 102 which received only intramammary injections, and hence seems unnecessary.

It appears that a series of double restimulations of a lactating cow (cow 42) does not generate any significantly useful TGE antibody response when the inoculations are first started at any appreciable time after calving. However, if the TGE virus antigen prestimulations are initiated as soon as possible after calving, and in any event no later than 24 hours thereafter, and the multiple consecutive-day restimulations are given at optimum regular intervals thereafter, then a much higher level of anti-TGE antibodies can be obtained. Best results will be obtained by giving a second prestimulation within 18 to 30 hours of the first prestimulation.

The anti-TGE antibody assay data further show that a series of single restimulation shots each containing 5 $\times 10^5$ $LD_{50}$ of the TGE virus antigen per quarter given at weekly intervals (cow 368) will not stimulate a useful level of anti-TGE antibody response as measured by the in vitro titration test even though the cow has been prepartum inoculated. Based on the extremely low titers observed, it would be expected, based on the relationships between the other in vitro and in vivo titers shown in Table I, that the in vivo assay would not be higher than about 1:1 or 100 BPPU and would most probably be less than 1:1 for any in vitro titers of 1:10 or less observed for any single restimulation shot periods after the first one. From this observation it is concluded that while a useful level of antibodies may be obtained in the first 2 weeks after calving when a cow has been prepartum inoculated, it would not be economically feasible over a 5 to 7 month lactating period to produce anti-TGE antibodies using only a single-shot restimulation procedure if each inoculation dose per quarter contains $5 \times 10^5$ $LD_{50}$ units or less of the TGE virus antigen.

If, however, the dosage of the TGE virus antigen is increased above this quantity and if the bovine has first been prestimulated either during her dry preparturition period or within 24 hours of calving as previously described for the preferred double restimulation procedure, then higher yields of the anti-TGE antibody will be obtained. In particular, when a single restimulation procedure is to be followed, then a significantly greater quantity, such as about 7 to $10 \times 10^5$ $LD_{50}$ units or even more, of the TGE virus antigen should be inoculated into each quarter at the time of each single restimulation. When required to prevent undesired udder reactions due to excessive volume, the single inoculation dose may be used in a more concentrated form than the inoculation doses used for the double restimulation procedure so as to reduce to an acceptable level the dose volume.

The in vitro TGE antibody assays for cow 31 indicate that the NADL TGE virus antigen is about of equal effectiveness in stimulating a TGE antibody response in a cow that has been inoculated both prepartum and postpartum in accordance with the invention process.

The in vitro anti-TGE antibody titers for cows 10, 359, 102 and 406 are graphically illustrated in FIGS. 1, 2, 3 & 4 respectively and show the assays for all days in the intervals between the series of restimulation shots. The figures graphically indicate that the double restimulation on consecutive days at 6 or 7-day intervals generates a 4 to 32 fold response in antibodies production during the three to four days following the last restimulation and that during the remaining 2 to 3 days of most intervals the antibody level still holds at a useful 1:20 titer, which, as the data in Table 1 shows, will usually be equivalent to at least a protective pig titer of 1:2 or 200 BPPU.

While an arbitrary 6-day interval was chosen between the series of restimulation inoculations after the second series, it seems obvious from the data plotted in FIGS. 1, 2, 3 and 4 that an even greater production of anti-TGE antibodies could have been obtained by utilizing shorter intervals such as 4 or 5 days between the series of restimulation inoculations provided they did not cause a immunogenic paralysis or mastitis response in the udder. The desirability of such shorter intervals would, of course, have to be determined by cost analyses to determine if the added value of the increased production of antibodies would more than offset the added cost of more frequent double restimulations. Conversely, such economic analyses could indicate that minimum anti-TGE antibody costs could be achieved by utilizing longer intervals between multiple restimulations, such as seven to ten day intervals or so long as the level of antibodies continued at economically useful levels in the bovine milk.

Protective Effect of the Bovine Milk Containing Anti-TGE Antibodies

In Table 2 there is compiled the results of a series of experiments conducted to determine the protective properties of different samples of filtered and decreamed milk, that had been obtained at various intervals after calving from bovine that had been restimulated by the invention method. The data indicates that 32,000 baby pig protective units (BPPU) a day protected all the tested baby pigs from mortality against a challenge with 100 $LD_{50}$ of the National Animal Disease Laboratory (NADL) TGE virus while 16,000 BPPU per day protected only 15 of the 24 tested pigs. The results further confirmed that the level of BPPU determined for any sample of bovine milk correlates with the protective effect actually observed when that milk is fed propylactically to challenged baby pigs. Based on this observation, it was concluded that to be effective the quantity of bovine milk fed to baby pigs must be adjusted in accordance with the concentration of baby pig protective units contained in the milk, or, in other words, that the BPPU titer be used as a standard for determining the potency of and hence the quantity required for any given sample or combined samples of the bovine milk fed to baby pigs for propylactic protection.

Based on the results of the experiments compiled in Table 2, two additional series of experiments were conducted to determine the effectiveness of various samples of bovine milk containing anti-TGE antibodies fed prophylactically in a quantity providing 32,000 BPPU daily to each of a number of baby pigs, either kept in isolation or with a nursing litter, Tables 3 and 4 respectively, when each was challenged with 100 $LD_{50}$ of the NADL TGE virus.

In Table 3 there is compiled the results of force feeding baby pigs kept in individual isolation units. The pooled first 2 days colostrum and the pooled milk samples obtained from the 3-day periods immediately following the first three double restimulations of cows 10, 359, 102 and 406 were fed to 16 test groups each having four baby pigs. Of the 64 pigs tested only 12, or 18.7% exhibited any morbidity and only five, or 7.8% died, from TGE when protected with the bovine milk containing anti-TGE antibodies as compared to the 100% morbidity and mortality observed in the four control pigs receiving only normal cow's milk.

From Table 4, compiling the results of protective tests for nursing baby pigs supplementally force fed the pooled first 2 days' colostrum and the pooled milk from the 3-day periods immediately following the first three double restimulations of cows 359 and 10, it can be seen that the various milk samples containing anti-TGE antibodies, when fed three times a day in a quantity providing 32,000 BPPU to each pig, protected 43 of 64 tested pigs, or 65.7% against any signs of morbidity and 52 of the same 64 pigs, or 81.3% against death. By comparison of the 31 nursing control pigs supplementally force fed normal bovine milk, only three of the 31, or 9.7% did not exhibit morbidity while only six of the 31, or 19.5% did not die. Additionally all the survivors of the pigs fed the bovine milk containing anti-TGE antibodies grew normally while the pigs fed the normal cow's milk remained stunted.

It is recognized in the field of animal disease that artifical challenges like those used for the tests shown in Tables 3 and 4 often can be more severe than a challenge experienced by baby pigs naturally exposed to the disease. Further, it is recognized that the force feeding of baby pigs, also having available alternative sources of milk, may be ineffective for those baby pigs who have fed to satiation prior to force feeding, because of the propensity of such pigs to regurgitate some or all of the force fed milk. Also, less than the forcefed amount of milk may be retained by baby pigs suffering from other digestive disorders. Finally, not all baby pigs in any sizeable population of tested pigs will be equally healthy, some being more susceptible to TGE viruses than others. All of these enumerated factors, plus others which may also be important, could be contributing to the less than 100% protection observed for the baby pigs described in Tables 3 and 4 that were force fed the invention bovine milk containing anti-TGE antibodies.

It would be obvious that the problem of regurgitating due to satiation or other digestive disorders could be minimized and possibly obviated by making available to baby pigs to be protected, the bovine milk product containing anti-TGE antibodies fortified, if desired, by vitamin, mineral, antibiotic, etc. supplements, so formulated, as for example with sugars or salt, ands dispensed, as for example in self-feeders, that the baby pig would have a preference for and thus consume the calculated amount of the invention milk product required for protection against TGE. Additionally, such a self-feeding system would minimize the cost of administering the invention milk product and provide an ideal way of feeding nutritional or other propylactic supplements to the baby pigs. In case the baby pigs do not consume the amount of immune milk required to give adequate immunity by a self-feeder system of administration, such as might occur in baby pigs up to two or three days of age, then it may be necessary to supplement or even substitute for the self-feeding procedure in these first few days, a force feeding procedure to insure adequate consumption of the TGE immune milk product.

In any such force feeding procedure, whether used solely or to supplement a self-feeding procedure, frequent feedings of small quantities of the TGE immune milk product is most advantageous if the maximum protective effect of the immune milk product is to be realized.

In those instances where the natural challenge is greater than that used in Tables 3 and 4, or a greater degree of proection is desired, then, of course, more than the 32,000 BPPU used in these experiments could be fed to provide more absolute protection if the economics of the situation makes this desirable. Alternatively, when a natural challenge of lesser infectivity is experienced or anticipated then a quantity considerably smaller than 32,000 BPPU could be used with good results. In this connection, in normal natural challenge situations, it is expected that about 16,000 BPPU fed to each pig per day up to about 10 to 14 days of age may be sufficient to confer optimum protection from an economic standpoint, considering the cost of the immune milk product versus losses caused by deaths to insufficiently protected or runt baby pigs. Since, as is readily apparent, this economically determined optimum can depend upon many factors, such as the severity of the TGE disease experienced by the pork producer, the environment of susceptible baby pigs, the time of year and the prevailing weather conditions, and so forth, it is not possible to absolutely delineate any one figure that would be applicable to all fact situations. After a limited experience, however, with different quantities, the optimun BPPU level can be readily ascertained by the pork producer for his particular situation.

In addition to its propylactic utilization, the bovine milk containing anti-TGE antibodies may also be applied therapeutically for the treatment of TGE, especially when the disease has not progressed too far. During the early stages of the disease, before considerable villus atrophy has taken place, the anti-TGE antibodies present in the bovine milk product of this invention would be expected to effectively neutralize the TGE virus and thus prevent development of the later mortality-inducing effects of TGE. Even piglets suffering from an advanced form of TGE may exhibit a higher percentage of recovery if fed TGE virus-neutralizing quantities of the invention milk products because of the fast villus regeneration observed in young pigs.

While the above example utilized a living gut-origin TGE virus as the TGE virus antigen, there could also be used any other living TGE virus having immunogenic properties such that if fed to a pregnant sow, serological negative to TGE, four weeks prior to her expected farrowing date in a quantity providing $5 \times 10^5$ $LD_{50}$ infective doses of the virus, it would stimulate production of antibodies in her colostrum and milk that would protect her nursing young against an oral challenge with 100 $LD_{50}$ of the NADL TGE virus. By "protect" is meant that while a few of the nursing pigs might exhibit morbidity no otherwise healthy nursing pigs receiving an adequate quantity of the sow's milk should die from the TGE challenge virus.

Using this test, it can be determined if other living TGE virus obtained from other sources, such as a cell cultured TGE virus propagated under favorable conditions would be a suitable TGE virus antigen for use in the invention process either by itself or in admixture with a live gut-derived TGE virus. When such mixtures are to be used, their suitability as a TGE virus antigen should be determined by feeding the proposed mixture to the pregnant sow as above described to determine if it will have the immunogenic character necessary to stimulate protective anti-TGE antibodies in the mammary gland of a lactating bovine. For brevity, any living TGE virus antigen or antigen mixture having the above characteristics will be referred to as an "immunogenic living transmissable gastroenteritis virus".

When the bovine milk product containing anti-TGE antibodies is to be used as a feed or liquid supplement for baby pigs for protection against TGE, it may be processed as follows to give a sterile milk product free of infective organisms. The whole milk after filtering is passed through a cream separator to give a skim milk product to which there is then added 2 mls. of B-propiolactone per 1000 mls. of the skim milk. This mixture is incubated 2 hours at 37°C. and then stored for at least 24 hours at 4°C. before use. After this treatment, the skim milk tests negative to bacteria, mycoplasma or viruses. This treatment appears to have no effect on the number of BPPU's in the skim milk. Baby pigs fed 27 mls. of the treated milk containing 400 BPPU's/ml. 3 times a day did not show any adverse effects and resisted a challenge of 100 $LD_{50}$ of the NADL TGE virus given 48 hours after the start of the feeding program. Alternatively, in place of B-propiolactone there may be used other equivalent chemical sterilants, such as ethylene oxide, propylene oxide and epichlorohydrin described in U.S. Pat. No. 2,705,696, and like sterilants, to free the invention milk products of infectuous microorganisms without significantly diminishing antibody potency.

If desired the treated skim milk may be concentrated or lyophilized to give a more potent milk product. Alternatively, the whey fraction may first be isolated and then treated with the B-propiolactone as above described, and then either be used as such or it may first be concentrated or lyophilized before use.

With either the skim milk or the whey product maximum retention of anti-TGE antibodies is observed when the products are stored at 4°C. before use.

As employed in the claims, the expression "bovine milk product containing anti-transmissable gastroetneritis antibodies" means that the product, be it the colostrum or whole milk or the skim milk, whey, or gamma globulin fractions obtained from the whole milk or colostrum, contains antibodies capable of neutralizing living NADL TGE virus by an in vivo neutralization test like that described in Footnote 5 of Table 1.

TABLE 1

PRE- AND POST-PARTURITION IMMUNIZATION OF BOVINE WITH TGE VIRUS ANTIGEN[1]
AND ASSAY OF ANTI-TGE ANTIBODY IN THE COLOSTRUM AND MILK[2]

| Cow No. | Innoculation Site | Days Prior to Parturition of Innoculations | Days After Parturition of Innoculations | Post Partum day of Milking | ANTI-TGE ANTIBODY ASSAY Cell Culture Titer (In Vitro Test)[4] | Pig Protective Titer (In Vivo Test)[5] | Baby Pig Protective Units (BPPU) per Milliliter of Milk[6] |
|---|---|---|---|---|---|---|---|
| 10 | IMM[3] | 34, 22, 8 | | 0 | 1:640 | 1:8 | 800 |
| | | | | 1 | 1:320 | 1:16 | 1600 |
| | | | | 2 | 1:320 | 1:2 | 200 |
| | IMM[3] | | 6 and 7 | 8 | 1:160 | 1:8 | 800 |
| | | | | 9 | 1:640 | 1:8 | 800 |
| | | | | 10 | 1:160 | 1:8 | 800 |
| | IMM[3] | | 14 and 15 | 16 | 1:160 | 1:4 | 400 |
| | | | | 17 | 1:320 | 1:4 | 400 |
| | | | | 18 | 1:80 | 1:2 | 200 |
| | IMM[3] | | 21 and 22 | 23 | 1:160 | 1:2 | 200 |
| | | | | 24 | 1:160 | 1:2 | 200 |
| | | | | 25 | 1:40 | 1:2 | 200 |
| | IMM[3] | | 28 and 29 | 30 | 1:40 | 1:2 | 200 |
| | | | | 31 | 1:320 | 1:2 | 200 |
| | | | | 32 | 1:160 | 1:2 | 200 |

TABLE 1—Continued

PRE- AND POST-PARTURITION IMMUNIZATION OF BOVINE WITH TGE VIRUS ANTIGEN[1]
AND ASSAY OF ANTI-TGE ANTIBODY IN THE COLOSTRUM AND MILK[2]

| Cow No. | Innocula-tion Site | Days Prior to Parturition of Innoculations | Days After Parturition of Innoculations | Post Partum day of Milking | ANTI-TGE ANTIBODY ASSAY Cell Culture Titer (In Vitro Test)[4] | Pig Protective Titer (In Vivo Test)[5] | Baby Pig Protective Units (BPPU) per Milliliter of Milk[6] |
|---|---|---|---|---|---|---|---|
|  | IMM[3] |  | 35 and 36 | 37 | 1:20 | 1:4 | 400 |
|  |  |  |  | 38 | 1:80 | 1:2 | 200 |
|  |  |  |  | 39 | 1:20 | 1:2 | 200 |
| 359 | IMM[3] | 43, 29, 15 |  | 0 | 1:640 | 1:16 | 1600 |
|  |  |  |  | 1 | 1:320 | 1:16 | 1600 |
|  |  |  |  | 2 | 1:160 | 1:4 | 400 |
|  | IMM[3] |  | 6 and 7 | 8 | 1:320 | 1:16 | 1600 |
|  |  |  |  | 9 | 1:640 | 1:16 | 1600 |
|  |  |  |  | 10 | 1:640 | 1:8 | 800 |
|  | IMM[3] |  | 14 and 15 | 16 | 1:320 | 1:16 | 1600 |
|  |  |  |  | 17 | 1:320 | 1:8 | 800 |
|  |  |  |  | 18 | 1:160 | 1:8 | 800 |
|  | IMM[3] |  | 21 and 22 | 23 | 1:160 | 1:8 | 800 |
|  |  |  |  | 24 | 1:320 | 1:8 | 800 |
|  |  |  |  | 25 | 1:320 | 1:8 | 800 |
|  | IMM[3] |  | 28 and 29 | 30 | 1:40 | 1:4 | 400 |
|  |  |  |  | 31 | 1:80 | 1:4 | 400 |
|  |  |  |  | 32 | 1:20 | 1:4 | 400 |
|  | IMM[3] |  | 35 and 36 | 37 | 1:160 | 1:8 | 800 |
|  |  |  |  | 38 | 1:160 | 1:4 | 400 |
|  |  |  |  | 39 | 1:80 | 1:4 | 400 |
| 102 | IMM[3] | 30, 16 |  | 0 | 1:160 | 1:16 | 1600 |
|  |  |  |  | 1 | 1:80 | 1:16 | 1600 |
|  |  |  |  | 2 | 1:40 | 1:16 | 1600 |
|  | IMM[3] |  | 6 and 7 | 8 | 1:160 | 1:8 | 800 |
|  |  |  |  | 9 | 1:320 | 1:4 | 400 |
|  |  |  |  | 10 | 1:40 | 1:2 | 200 |
|  | IMM[3] |  | 14 and 15 | 16 | 1:20 | 1:2 | 200 |
|  |  |  |  | 17 | 1:80 | 1:4 | 400 |
|  |  |  |  | 18 | 1:40 | 1:4 | 400 |
|  | IMM[3] |  | 21 and 22 | 23 | 1:40 | 1:4 | 400 |
|  |  |  |  | 24 | 1:160 | 1:4 | 400 |
|  |  |  |  | 25 | 1:160 | 1:4 | 400 |
|  | IMM[3] |  | 28 and 29 | 30 | 1:80 | 1:4 | 400 |
|  |  |  |  | 31 | 1:160 | 1:4 | 400 |
|  |  |  |  | 32 | 1:40 | 1:2 | 200 |
|  | IMM[3] |  | 35 and 36 | 37 | 1:80 | 1:2 | 200 |
|  |  |  |  | 38 | 1:80 | 1:2 | 200 |
|  |  |  |  | 39 | 1:20 | 1:2 | 200 |
| 406 | IMM[3] & IM[7] | 36, 8 |  | 0 | 1:320 | 1:4 | 400 |
|  |  |  |  | 1 | 1:320 | 1:4 | 400 |
|  |  |  |  | 2 | 1:160 | 1:4 | 400 |
|  | IMM[3] & IM[7] |  | 6 and 7 | 8 | 1:80 | 1:8 | 800 |
|  |  |  |  | 9 | 1:160 | 1:8 | 800 |
|  |  |  |  | 10 | 1:80 | 1:8 | 800 |
|  | IMM[3] & IM[7] |  | 14 and 15 | 16 | 1:160 | 1:8 | 800 |
|  |  |  |  | 17 | 1:80 | 1:4 | 400 |
|  |  |  |  | 18 | 1:40 | 1:4 | 400 |
|  | IMM[3] & IM[7] |  | 21 and 22 | 23 | 1:40 | 1:2 | 200 |
|  |  |  |  | 24 | 1:80 | 1:4 | 400 |
|  |  |  |  | 25 | 1:80 | 1:2 | 200 |
| 42 | IMM[8] | None | 5 and 6 | 7 | 1:40 |  | No Baby Pig Protection |
|  |  |  |  | 8 | 1:40 |  | No Baby Pig Protection |
|  |  |  |  | 9 | 1:20 |  | No Baby Pig Protection |
|  | IMM[8] |  | 12 and 13 | 14 | 1:40 | 1:1 | 100 |
|  |  |  |  | 15 | 1:20 | 1:1 | 100 |
|  |  |  |  | 16 | 1:10 |  | No Baby Pig Protection |
|  | IMM[8] |  | 19 and 20 | 21 | 1:20 | 1:1 | 100 |
|  |  |  |  | 22 | 1:20 |  | No Baby Pig Protection |
|  |  |  |  | 23 | 1:10 |  | No Baby Pig Protection |
| 368 | IMM[3] | 42, 28, 14 |  | 0 | 1:640 |  |  |
|  |  |  |  | 1 | 1:160 |  |  |
|  |  |  |  | 2 | 1:80 |  |  |
|  |  |  |  | 5 | 1:40 |  |  |
|  | IMM[3] |  | 6 | 7 | 1:80 |  |  |
|  |  |  |  | 8 | 1:80 |  |  |
|  |  |  |  | 10 | 1:40 |  |  |
|  | IMM[3] |  | 14 | 16 | 1:10 |  |  |
|  |  |  |  | 17 | 1:20 |  |  |
|  |  |  |  | 18 | 1:10 |  |  |
|  | IMM[3] |  | 21 | 23 | 1:20 |  |  |
|  |  |  |  | 24 | 1:20 |  |  |
|  |  |  |  | 26 | 1:10 |  |  |
|  | IMM[3] |  | 28 | 29 | 1:10 |  |  |
|  |  |  |  | 30 | 1:10 |  |  |
|  |  |  |  | 31 | 1:20 |  |  |
|  |  |  |  | 32 | 1:10 |  |  |
| 31 | IMM[3] | 43, 29, 15 |  | 0 | 1:160 |  |  |
|  |  |  |  | 1 | 1:16 |  |  |
|  |  |  |  | 2 | 1:80 |  |  |
|  |  |  | 6 and 7 | 8 | 1:40 |  |  |
|  |  |  |  | 9 | 1:160 |  |  |
|  |  |  |  | 10 | 1:80 |  |  |
|  |  |  | 14 and 15 | 16 | — |  |  |
|  |  |  |  | 17 | 1:80 |  |  |
|  |  |  |  | 18 | 1:80 |  |  |

TABLE 1 — Continued

PRE- AND POST-PARTURITION IMMUNIZATION OF BOVINE WITH TGE VIRUS ANTIGEN[1] AND ASSAY OF ANTI-TGE ANTIBODY IN THE COLOSTRUM AND MILK[2]

| Cow No. | Innocula-tion Site | Days Prior to Parturition of Innoculations | Days After Parturition of Innoculations | Post Partum day of Milking | ANTI-TGE ANTIBODY ASSAY Cell Culture Titer (In Vitro Test)[4] | Pig Protective Titer (In Vivo Test)[5] | Baby Pig Protective Units (BPPU) per Milliliter of Milk[6] |
|---|---|---|---|---|---|---|---|
| | | | 21 and 22 | 23 | 1:40 | | |
| | | | | 24 | 1:40 | | |
| | | | | 25 | 1:80 | | |
| | | | 28 and 29 | 30 | 1:20 | | |
| | | | | 31 | 1:20 | | |
| | | | | 32 | 1:40 | | |
| | | | 35 and 36 | 37 | 1:20 | | |
| | | | | 38 | 1:20 | | |
| | | | | 39 | 1:20 | | |

[1] TGE virus antigen obtained from the Ohio TGE virus isolant was used for cows 10, 359, 102, 406, 42 and 368. National Animal Disease Laboratory (NADL) TGE virus was used as the antigen for cow 31. The NADL virus was a Miller No. 3 strain of TGE challenge virus obtained from an outbreak of TGE on the farm of Eli C. Miller, Fredricksburg, Ohio in 1965. Suspension of small intestine obtained from a TGE-infected baby pig was passesd thirteen times in primary porcine kidney cell cultures at six to eight day intervals. The thirteenth cell culture passage was filtered through a 0.45 micron millipore filter and was used to infect a germ-free pig. Subsequently, two more passages in germ-free pigs were made, using 0.45 micron filtered suspensions of the small intestines.
[2] Milk assayed was strained through a Kendall non-gauze filter pad and decreamed by passage through a DeLaval No. 108 cream separator.
[3] 5 milliliters of $10^5 LD_{50}$ units of TGE virus antigen injected into each quarter both pre- and post-partum at a site approximately 1½ inches above the base of the teat using a polypropylene disposable syringe and a 22-gauge steel needle.
[4] The highest twofold serial dilution of decreamed milk with Hanks' Balanced Salt Solution (HBSS) starting at 1:10 (1 volume of milk and 9 volumes of HBSS) that neutralizes an equal volume of Purdue high cell culture passage TGE virus containing 1000 TC-LD$_{50}$ per ml. after being incubated for one hour at 37°C., as determined by the absence of any cytopathic effect seven days after 0.2 mls. of the incubated mixture has been added to a 30 ml. cell culture container containing a primary pig kidney cell culture.
[5] The highest twofold serial dilution of the milk with Hanks' Balanced Salt Solution (HBSS) starting at 1:2 (1 volume of milk and 1 volume of HBSS) that neutralizes an equal volume of National Animal Disease Laboratory (NADL) TGE virus containing 100 LD$_{50}$ for three-day-old baby pigs per ml. after being incubated for one hour at 37°C., as determined by the absence of any mortality for seven days in two three-day old baby pigs each fed 2 mls. of the incubated mixture.
[6] 100 × Pig Protective Titer.
[7] An additional 5 mls. of $10^5 LD_{50}$ units of TGE virus antigen was also injected intramuscularly.
[8] Same as Footnote 3, except only post-partum injections used.

TABLE 2

Relationship between the Baby Pig Protective Titer of Individual Samples[1] of the Immune Milk and the Protection Afforded Baby Pigs Against Challenge with TGE Virus[2].

| Post Partum Days Milk | BPPU[3]/ml of Milk | Total Milk Fed ea.pig per Day | Total BPPL Fed ea. pig per Day | No. of Test Pigs | Results of Challenge[5] Morbidity | Mortality |
|---|---|---|---|---|---|---|
| 0–2 | 1600 | 40 ml | 64,000 | 12 | 0/12 | 0/12 |
| 8–10 | 800 | 40 ml | 32,000 | 12 | 2/12 | 0/12 |
| 16–18 | 800 | 40 ml | 32,000 | 12 | 0/12 | 0/12 |
| 23–25 | 400 | 40 ml | 16,000 | 12 | 6/12 | 4/12 |
| 30–32 | 400 | 40 ml | 16,000 | 12 | 6/12 | 5/12 |

[1] Not all of the milk samples were from the same cow. All of the postpartum milk samples were obtained from cows that had been double restimulated except for the colostrum obtained on the first two days after calving. All milk samples were filtered and decreamed.
[2] Challenge consisted of 100 LD$_{50}$ of NADL TGE virus given orally to each baby pig following the first feeding on the third day of age.
[3] Baby Pig Protective Units
[4] Fed to baby pigs in 10 ml increments four times a day starting at two days of age and continuing for the following seven days. In addition, normal cow's milk was offered in a milk pan to each pig.
[5] Based on daily observations of the baby pigs for seven days following challenge.

TABLE 3

Protective Effect of the Immune Milk[1] for Baby Pigs Housed in Individual Isolation Units against Challenge with TGE Virus[2]

| Cow No. | Post Partum Days Milk | BPPU[3]/ml of Milk | No. of Pigs | Results of Morbidity | Challenge[4] Mortality |
|---|---|---|---|---|---|
| 10 | 0–2 | 1600 | 4 | 1/4 | 0/4 |
| | 8–10 | 800 | 4 | 0/4 | 0/4 |
| | | 400 | 4 | 1/4 | 0/4 |
| 6–18 | | | | | |
| | 23–25 | 200 | 4 | 1/4 | 0/4 |
| 359 | 0–2 | 1600 | 4 | 0/4 | 0/4 |
| | 8–10 | 1600 | 4 | 1/4 | 1/4 |
| | | 1600 | 4 | 0/4 | 0/4 |
| 6–18 | | | | | |
| | 23–25 | 800 | 4 | 2/4 | 1/4 |
| 102 | 0–2 | 1600 | 4 | 2/4 | 0/4 |
| | 8–10 | 800 | 4 | 0/4 | 0/4 |
| | 16–18 | 200 | 4 | 0/4 | 0/4 |
| | 23–25 | 400 | 4 | 1/4 | 1/4 |
| 406 | 0–2 | 1600 | 4 | 2/4 | 0/4 |
| | 8–10 | 800 | 4 | 0/4 | 0/4 |
| | 16–18 | 200 | 4 | 0/4 | 0/4 |
| | 24–25 | 400 | 4 | 1/4 | 1/4 |
| Control Milk | — | — | 4 | 4/4 | 4/4 |

[1] Bovine immune milk containing anti-TGE antibodies used was filtered and decreamed. It was force fed to the baby pigs three times a day in a quantity providing 32,000 BPPU a day to each pig starting at two days of age and continuing for the following seven days. In addition, normal cow's milk was offered in a milk pan to each pig housed in individual isolation units.
[2] Challenge consisted of 100 LD$_{50}$ of NADL TGE virus administered orally to each baby pig following the first feeding on the third day of age.
[3] Baby Pig Protection Units
[4] Based on daily observations of the baby pigs for seven days following challenge.

TABLE 4

Protective Effect of the Immune Milk[1] for Baby Pigs Nursing on Non-TGE Immune Sows[2] Against Challenge with TGE Virus[3]

| Cow No. | Post Partum Days of Milk | BPPU[4] /ml of Milk | No. of Test Pigs | Results of Challenge[5] Morbidity | Mortality |
|---|---|---|---|---|---|
| 359 | 0–2 | 1600 | 9 | 3/9 | 2/9 |
|  | 8–10 | 1600 | 5 | 0/5 | 0/5 |
|  | 16–18 | 1600 | 11 | 3/11 | 2/11 |
|  | 23–25 | 800 | 8 | 4/8 | 2/8 |
| 102 | 0–2 | 1600 |  | 1/6 |  |
|  | 8–10 | 800 | 8 | 3/8 | 2/8 |
|  | 16–18 | 200 | 8 | 3/8 | 2/8 |
|  | 23–25 | 400 | 9 | 4/9 | 2/9 |
|  | Control Non Immune Milk |  | 9 | 8/9 | 7/9 |
|  | Control Non Immune Milk |  | 5 | 5/5 | 5/5 |
|  | Control Non Immune Milk |  | 7 | 7/7 | 5/7 |
|  | Control Non Immune Milk |  | 10 | 8/10 | 8/10 |

[1] Bovine Immune Milk containing anit-TGE antibodies used was filtered and decreamed. It was force fed to the baby pigs three times a day in a quantity providing 32,000 BPPU a day to each pig starting at two days of age and continuing for the following seven days.
[2] Normal primiparous sows having no detectable TGE antibody in their serum or colostrum.
[3] Challenge consisted of 100 LD₅₀ of NADL TGE virus administered orally to each baby pig at three days of age.
[4] Baby Pig Protective Units
[5] Based on daily observations of the baby pigs for seven days following challenge.

What is claimed is:

1. A bovine milk baby pig supplement product containing a prophylactically active quantity, effective in baby pigs to withstand a lethal-challenge infection of the pathogen of transmissible gastroenteritis that otherwise typically produces mortality in baby pigs, of anti-transmissible gastroenteritis antibodies comprising the colostrum, whole milk, decreamed colostrum, decreamed milk, whey, whey gamma globulin fraction, or mixtures thereof derived from the mammary gland secretions of a bovine that has been intramammarily stimulated with an immunogenic, pathogenic, or virulent living transmissible gastroenteritis virus, said milk product having been effectively treated with B-propiolactone or an equivalent chemical sterilant until it tests negative to bacteria, mycoplasma and viruses, and is thereby determined to be free of infectious microoganisms.

2. A method of protecting a baby pig from transmissible gastroenteritis which comprises feeding to the pig the chemically sterilized bovine milk product of claim 1 in a quantity sufficient to prevent the pig from dying from the disease.

3. The method of claim 2 wherein the bovine milk product is fed to the baby pig prior to infection with the disease.

4. The method of claim 2 wherein the bovine milk product is fed to the baby pig after infection with the disease.

5. A method of obtaining a sterilized bovine milk product containing anti-transmissible gastroenteritis antibodies which comprises:

A. prestimulating the mammary gland of a pregnant bovine with an immunogenic, pathogenic, or virulent living transmissible gastroenteritis virus during the period commencing about 60 days prior to calving and ending about 48 hours after calving; and B. restimulating, after calving, the mammary gland of the bovine with the immunogenic, pathogenic, or virulent living transmissible gastroenteritis virus on at least two consecutive days at intervals during the lactation period of the bovine;

C. milking the bovine after calving to obtain milk containing anti-transmissible gastroenteritis antibodies;

D. chemically sterilizing the milk with B-propiolactone or an equivalent chemical sterilant until it tests negative to bacteria, mycoplasma and viruses, and is thereby determined to be free of infectious micoorganisms;

E. each of said mammary gland prestimulating and restimulating steps and being effected by aseptic injection of the transmissible gastroenteritis virus into each quarter of the mammary gland of the bovine reaching the cistern of each quarter.

6. The sterilized bovine milk made by the method of claim 5.

7. The method of claim 5 further characterized in that the bovine milk is processed to a decreamed milk, whey or whey gamma globulin fraction prior to being chemically sterilized.

8. The bovine milk product made by the method of claim 7.

9. The method of claim 5 wherein the mammary gland is prestimulated during the 60 day period preceding calving but not during the 48 hour period following calving.

10. The sterilized bovine milk product obtained by the method of claim 9.

11. The method of claim 5 wherein the mammary gland is prestimulated only during the 48 hour period following calving.

12. A method of obtaining a sterilized bovine milk product containing anti-transmissible gastroenteritis anti-bodies which comprises:

A. prestimulating the mammary gland of a pregnant bovine with an immunogenic, pathogenic, or virulent living transmissible gastroenteritis virus during the period commencing about 60 days prior to calving and ending about 48 hours after calving; and B. restimulating, after calving, the mammary gland of the bovine with a single dose of the immunogenic, pathogenic, or virulent living transmissible gastroenteritis virus at intervals of 4 or more days apart during the lactation period of the bovine;

C. milking the bovine after calving to obtain milk containing anti-transmissible gastroenteritis antibodies;

D. chemically sterilizing the milk with B-propiolactone or an equivalent chemical sterilant until it tests negative to bacteria, mycoplasma and viruses, and is thereby determined to be free of infectious microorganisms;

E. each of said mammary gland prestimulating and restimulating steps and being effected by aseptic injection of the transmissible gastroenteritis virus into each quarter of the mammary gland of the bovine reaching the cistern of each quarter.

13. The sterilized bovine milk product made by the method of claim 12.

14. The method of claim 12 further characterized in that the bovine milk is processed to a decreamed milk, whey or whey gamma globulin fraction prior to being chemically sterilized.

15. The bovine milk product made by the method of claim 14.

16. The method of claim 13 wherein the mammary gland is prestimulated during the 60 day period preceding calving but not during the 48 hour period following calving.

17. The sterilized bovine milk product obtained by method of claim 16.

18. The method of claim 16 wherein the mammary gland is prestimulated only during the 48 hour period after calving.

* * * * *